(12) United States Patent
Inoue et al.

(10) Patent No.: US 10,323,745 B2
(45) Date of Patent: Jun. 18, 2019

(54) CONTROL APPARATUS FOR VEHICLE

(71) Applicant: TOYOTA JIDOSHA KABUSHIKI KAISHA, Toyota-shi, Aichi-ken (JP)

(72) Inventors: Daisuke Inoue, Toyota (JP); Kunio Hattori, Nagoya (JP); Hiroki Kondo, Miyoshi (JP); Kenji Matsuo, Toyota (JP); Mitsuhiro Fukao, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 337 days.

(21) Appl. No.: 15/303,634

(22) PCT Filed: Apr. 9, 2015

(86) PCT No.: PCT/IB2015/000694
§ 371 (c)(1),
(2) Date: Oct. 12, 2016

(87) PCT Pub. No.: WO2015/162492
PCT Pub. Date: Oct. 29, 2015

(65) Prior Publication Data
US 2017/0037965 A1    Feb. 9, 2017

(30) Foreign Application Priority Data
Apr. 25, 2014    (JP) ................................. 2014-091889

(51) Int. Cl.
*F16H 59/42*    (2006.01)
*F16H 61/662*    (2006.01)
(Continued)

(52) U.S. Cl.
CPC ..... *F16H 61/66259* (2013.01); *F16H 37/022* (2013.01); *F16H 59/42* (2013.01);
(Continued)

(58) Field of Classification Search
CPC .... F16H 61/66259; F16H 59/42; F16H 59/48; F16H 2059/425; F16H 37/022; F16H 2037/0226; F16H 2016/66222
See application file for complete search history.

(56) References Cited

U.S. PATENT DOCUMENTS

2001/0046924 A1* 11/2001 Tamura ............. F16H 61/66254
477/45
2009/0248262 A1* 10/2009 Hattori ............. F16H 61/66259
701/55
(Continued)

FOREIGN PATENT DOCUMENTS

JP    S63-28740 A    2/1988

*Primary Examiner* — Huan Le
(74) *Attorney, Agent, or Firm* — Oliff PLC

(57) ABSTRACT

When a power transmission path of a power transmission system is set to a second power transmission path, a continuously variable transmission is controlled at a speed ratio ($\gamma$) that provides a higher vehicle speed in the case where an input shaft angular acceleration ($d\omega i/dt$) is small than in the case where the input shaft angular acceleration ($d\omega i/dt$) is large. Therefore, it is possible to control the speed ratio ($\gamma$) of the continuously variable transmission to a speed ratio ($\gamma$) that reflects an inertial loss (Tli) of the continuously variable transmission. The inertial loss (Tli) changes with the input shaft angular acceleration ($d\omega i/dt$). Thus, in a vehicle in which the continuously variable transmission and a gear mechanism are provided in parallel with each other between an input shaft and an output shaft, it is possible to appropriately reduce a loss of the idling continuously variable transmission.

10 Claims, 5 Drawing Sheets

(51) Int. Cl.
*F16H 37/02* (2006.01)
*F16H 59/48* (2006.01)

(52) U.S. Cl.
CPC ........ *F16H 59/48* (2013.01); *F16H 2037/026* (2013.01); *F16H 2059/425* (2013.01)

(56) References Cited

U.S. PATENT DOCUMENTS

2011/0183810 A1* 7/2011 Choby .................... F16H 61/66
                                                                               477/120
2012/0245807 A1* 9/2012 Kurahashi ......... F16H 61/66259
                                                                               701/51

* cited by examiner

CONTROL APPARATUS FOR VEHICLE

BACKGROUND OF THE INVENTION

1. Field of the Invention

The invention relates to a control apparatus for a vehicle including a continuously variable transmission mechanism and a transmission mechanism provided in parallel with each other between a driving force source and a drive wheel.

2. Description of Related Art

There is well known a vehicle including a continuously variable transmission mechanism and a transmission mechanism provided in parallel with each other between an input rotating member and an output rotating member. The transmission mechanism has one or a plurality of gear stages. The power of a driving force source is transmitted to the input rotating member. The output rotating member outputs the power to a drive wheel. This is, for example, a vehicle described in Japanese Patent Application Publication No. 63-28740 (JP 63-28740 A). JP 63-28740 A describes a vehicle including a continuously variable transmission path and a direct drive path provided in parallel with each other between an input rotating member and an output rotating member. A continuously variable transmission is interposed in the continuously variable transmission path. The direct drive path has a fixed speed ratio close to the highest speed ratio in the continuously variable transmission path. The vehicle accelerates from the start of the vehicle by using the continuously variable transmission path. When the speed ratio in the continuously variable transmission path reaches the speed ratio in the direct drive path, the vehicle changes the transmission path to the direct drive path and continues traveling. In addition, JP 63-28740 A describes that, while the vehicle is traveling by using the direct drive path, a loss torque in the idling continuously variable transmission is reduced by controlling the speed ratio of the continuously variable transmission, which continues idling in a no-load state, to a low vehicle speed-side optimal speed ratio with respect to the highest speed ratio. The low vehicle speed-side optimal speed ratio is, for example, an intermediate speed ratio that is the speed ratio "1".

SUMMARY OF THE INVENTION

Incidentally, if the total loss torque of the idling continuously variable transmission mechanism is the sum of a friction loss of the continuously variable transmission mechanism and an inertial loss of the continuously variable transmission mechanism, the total loss torque may not be reduced even when the idling continuously variable transmission mechanism is controlled at the above-described intermediate speed ratio. Specifically, the friction loss generally becomes minimum at the intermediate speed ratio, and monotonously increases as the speed ratio gets close to the highest speed ratio or the lowest speed ratio. On the other hand, generally, the angular acceleration of an output-side rotating member (for example, a secondary pulley) of the continuously variable transmission mechanism is changed in accordance with the speed ratio with respect to the angular acceleration of an input-side rotating member (for example, a primary pulley) of the continuously variable transmission mechanism, and the angular acceleration of the output-side rotating member is increased as the speed ratio gets close to the highest speed ratio. Therefore, the inertial loss of the secondary pulley increases as the speed ratio gets close to the highest speed ratio, and monotonously decreases as the speed ratio gets close to the lowest speed ratio. For this reason, as described in JP 63-28740 A, in the transmission in which a change between the continuously variable transmission mechanism and the transmission mechanism is carried out at the highest speed ratio side of the continuously variable transmission mechanism, the total loss torque is reduced when the speed ratio of the idling continuously variable transmission mechanism is set to the intermediate speed ratio side as compared to when the speed ratio is set to the highest speed ratio side at which the change is carried out. However, in the transmission in which a change between the continuously variable transmission mechanism and the transmission mechanism is carried out at the lowest speed ratio side of the continuously variable transmission mechanism, when the speed ratio of the idling continuously variable transmission mechanism is changed from the lowest speed ratio side, at which the change is carried out, to the intermediate speed ratio side, the friction loss decreases, while, on the other hand, the inertial loss increases. Therefore, the total loss torque is not always reduced by changing the speed ratio to the intermediate speed ratio side depending on, for example, the magnitude of the inertial loss that changes with the angular acceleration of the primary pulley. Thus, when a reduction in the total loss torque of the continuously variable transmission mechanism is considered, there is still room for improvement in what speed ratio the idling continuously variable transmission mechanism is controlled at. The above-described inconvenience is not publicly known.

The invention provides a control apparatus that is able to appropriately reduce a loss of an idling continuously variable transmission mechanism in a vehicle including the continuously variable transmission mechanism and a transmission mechanism provided in parallel with each other between an input rotating member and an output rotating member.

A first aspect of the invention provides a control apparatus for a vehicle. The vehicle includes a continuously variable transmission mechanism, a transmission mechanism, and a clutch mechanism. The transmission mechanism has at least one gear stage. The continuously variable transmission mechanism and the transmission mechanism are provided in parallel with each other between an input rotating member and an output rotating member. Power of a driving force source is transmitted to the input rotating member. The output rotating member is configured to output the power to a drive wheel. The clutch mechanism is configured to selectively change a power transmission path between a first power transmission path and a second power transmission path. The power transmission path is configured to transmit the power of the driving force source to the drive wheel. The first power transmission path is a path in which the continuously variable transmission mechanism is interposed. The second power transmission path is a path in which the transmission mechanism is interposed. The control apparatus includes an electronic control unit. The electronic control unit is configured to, when the power is transmitted to the drive wheel through the second power transmission path, control the continuously variable transmission mechanism such that a speed ratio when an angular acceleration of the input rotating member is small is higher than the speed ratio when the angular acceleration of the input rotating member is large.

With this configuration, when the power transmission path is the second power transmission path, it is possible to control the speed ratio of the continuously variable transmission mechanism to the speed ratio that reflects the inertial loss of the continuously variable transmission mechanism. The inertial loss changes with the angular acceleration of the input rotating member. Thus, in the vehicle including the continuously variable transmission mechanism and the transmission mechanism provided in parallel with each other between the input rotating member and the output rotating member, it is possible to appropriately reduce the loss of the idling continuously variable transmission mechanism.

In the first aspect, the electronic control unit may be configured to i) calculate an estimated value of a friction loss of the continuously variable transmission mechanism, ii) calculate an estimated value of an inertial loss of the continuously variable transmission mechanism, iii) calculate a target speed ratio of the continuously variable transmission mechanism based on the estimated value of the friction loss and the estimated value of the inertial loss, and iv) when the power is transmitted to the drive wheel through the second power transmission path, control the continuously variable transmission mechanism at the target speed ratio. With this configuration, when the power transmission path is the second power transmission path, it is possible to control the speed ratio of the continuously variable transmission mechanism to the target speed ratio that reflects the friction loss of the continuously variable transmission mechanism and the inertial loss of the continuously variable transmission mechanism.

In the first aspect, the target speed ratio may be a speed ratio of the continuously variable transmission mechanism for minimizing a sum of the estimated value of the friction loss and the estimated value of the inertial loss. With this configuration, when the power transmission path is the second power transmission path, the sum of the friction loss of the idling continuously variable transmission mechanism and the inertial loss of the idling continuously variable transmission mechanism is reduced as much as possible. Therefore, fuel economy is improved.

In the first aspect, the electronic control unit may be configured to, when the power is transmitted to the drive wheel through the second power transmission path, control the continuously variable transmission mechanism at the target speed ratio until the electronic control unit determines to change the power transmission path to the first power transmission path. With this configuration, when it is determined to change the power transmission path to the first power transmission path, it is possible to prohibit control of the continuously variable transmission mechanism at the target speed ratio, and control the continuously variable transmission mechanism at the speed ratio as in the case where the power transmission path is the first power transmission path in preparation for a change of the power transmission path to the first power transmission path. Thus, it is possible to give a higher priority to drivability, such as suppression of a change shock, than to fuel economy.

In the first aspect, the electronic control unit may be configured to i) calculate an estimated value of a device loss of a thrust supply device configured to supply thrust to a rotating member of the continuously variable transmission mechanism, and ii) calculate a target speed ratio of the continuously variable transmission mechanism based on the estimated value of the friction loss, the estimated value of the inertial loss and the estimated value of the device loss. With this configuration, when the power transmission path is the second power transmission path, it is possible to control the speed ratio of the continuously variable transmission mechanism to the target speed ratio that reflects the friction loss of the continuously variable transmission mechanism, the inertial loss of the continuously variable transmission mechanism and the device loss of the thrust supply device. Thus, it is possible to further appropriately reduce the loss of the idling continuously variable transmission mechanism.

In the first aspect, the electronic control unit may be configured to i) calculate a target speed ratio of the continuously variable transmission mechanism based on the angular acceleration of the input rotating member by using a predetermined correlation between (a) the angular acceleration of the input rotating member and (b) a speed ratio of the continuously variable transmission mechanism for minimizing a sum of a friction loss of the continuously variable transmission mechanism and an inertial loss of the continuously variable transmission mechanism, the predetermined correlation being determined such that a speed ratio when the angular acceleration of the input rotating member is small is higher than the speed ratio when the angular acceleration of the input rotating member is large, and ii) when the power is transmitted to the drive wheel thorough the second power transmission path, control the continuously variable transmission mechanism at the target speed ratio. With this configuration, when the power transmission path is the second power transmission path, the speed ratio of the idling continuously variable transmission mechanism is controlled to the target speed ratio at which the sum of the friction loss of the continuously variable transmission mechanism and the inertial loss of the continuously variable transmission mechanism is reduced as much as possible. Thus, fuel economy is improved.

A second aspect of the invention provides a control apparatus for a vehicle. The vehicle includes a continuously variable transmission mechanism, a transmission mechanism, and a clutch mechanism. The transmission mechanism has at least one gear stage. The continuously variable transmission mechanism and the transmission mechanism are provided in parallel with each other between an input rotating member and an output rotating member. Power of a driving force source is transmitted to the input rotating member. The output rotating member is configured to output the power to a drive wheel. The clutch mechanism is configured to selectively change a power transmission path between a first power transmission path and a second power transmission path. The power transmission path is configured to transmit the power of the driving force source to the drive wheel. The first power transmission path is a path in which the continuously variable transmission mechanism is interposed. The second power transmission path is a path in which the transmission mechanism is interposed. The control apparatus includes an electronic control unit. The electronic control unit is configured to i) calculate an estimated value of a friction loss of the continuously variable transmission mechanism, ii) calculate an estimated value of an inertial loss of the continuously variable transmission mechanism, iii) calculate a target speed ratio of the continuously variable transmission mechanism based on the estimated value of the friction loss and the estimated value of the inertial loss, and iv) when the power is transmitted to the drive wheel through the second power transmission path, control the continuously variable transmission mechanism at the target speed ratio.

With this configuration, when the power transmission path is the second power transmission path, it is possible to control the speed ratio of the continuously variable transmission mechanism to the target speed ratio that reflects the friction loss of the continuously variable transmission mechanism and the inertial loss of the continuously variable transmission mechanism. Thus, in the vehicle including the continuously variable transmission mechanism and the transmission mechanism provided in parallel with each other between the input rotating member and the output rotating member, it is possible to appropriately reduce the loss of the idling continuously variable transmission mechanism.

In the second aspect, the target speed ratio may be a speed ratio of the continuously variable transmission mechanism for minimizing a sum of the estimated value of the friction loss and the estimated value of the inertial loss. With this configuration, when the power transmission path is the second power transmission path, the sum of the friction loss of the idling continuously variable transmission mechanism and the inertial loss of the idling continuously variable transmission mechanism is reduced as much as possible. Therefore, fuel economy is improved.

In the second aspect, the electronic control unit may be configured to, when the power is transmitted to the drive wheel through the second power transmission path, control the continuously variable transmission mechanism at the target speed ratio until the electronic control unit determines to change the power transmission path to the first power transmission path. With this configuration, when it is determined to change the power transmission path to the first power transmission path, it is possible to prohibit control of the continuously variable transmission mechanism at the target speed ratio, and control the continuously variable transmission mechanism at the speed ratio as in the case where the power transmission path is the first power transmission path in preparation for a change of the power transmission path to the first power transmission path. Thus, it is possible to give a higher priority to drivability, such as suppression of a change shock, than to fuel economy.

In the second aspect, the electronic control unit may be configured to i) calculate an estimated value of a device loss of a thrust supply device configured to supply thrust to a rotating member of the continuously variable transmission mechanism, and ii) calculate a target speed ratio of the continuously variable transmission mechanism based on the estimated value of the friction loss, the estimated value of the inertial loss and the estimated value of the device loss. With this configuration, when the power transmission path is the second power transmission path, it is possible to control the speed ratio of the continuously variable transmission mechanism to the target speed ratio that reflects the friction loss of the continuously variable transmission mechanism, the inertial loss of the continuously variable transmission mechanism and the device loss of the thrust supply device. Thus, it is possible to further appropriately reduce the loss of the idling continuously variable transmission mechanism.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Hereinafter, an embodiment of the invention will be described in detail with reference to the accompanying drawings.

Figure 1:
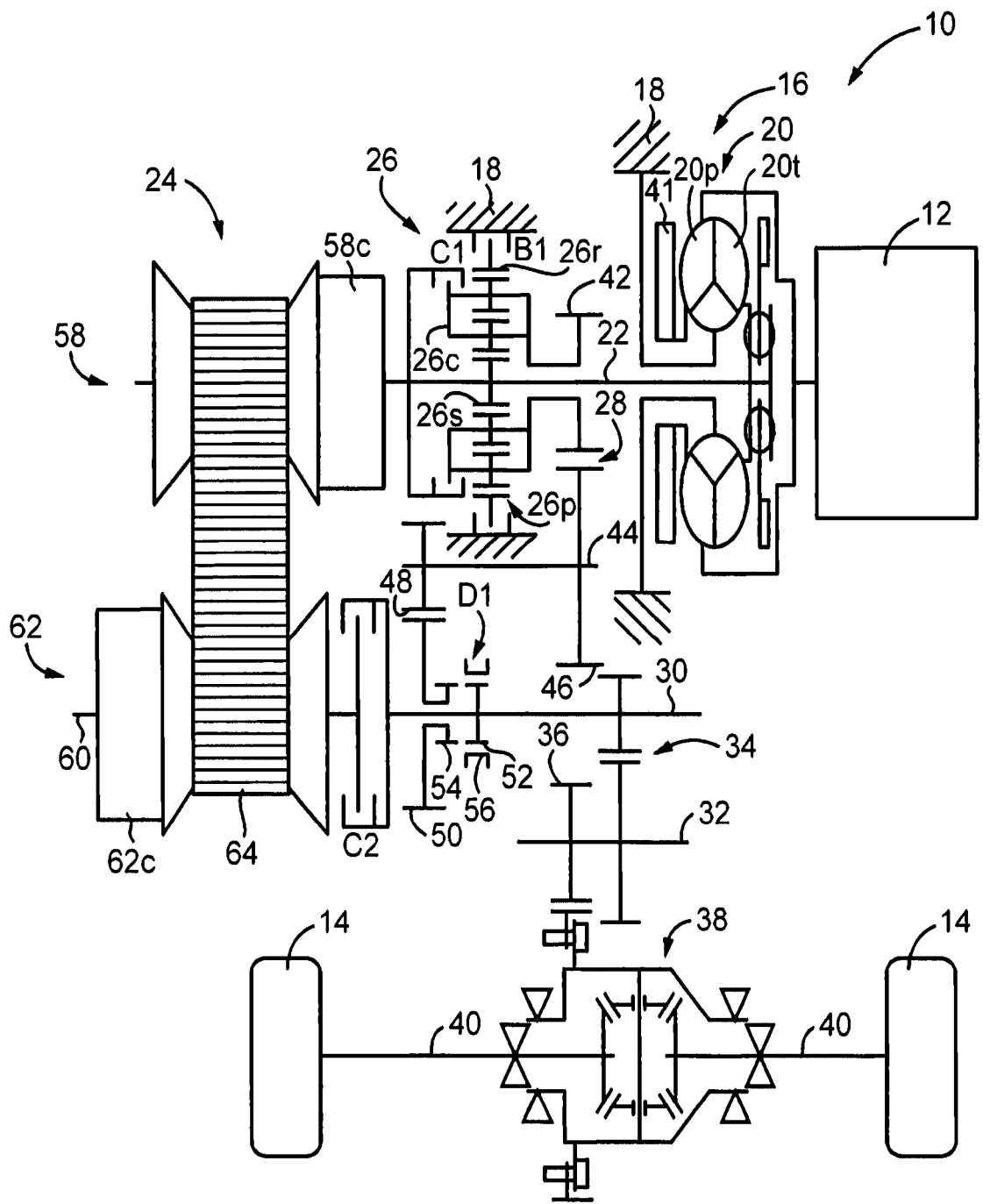
FIG. 1 is a view that illustrates the schematic configuration of a vehicle to which the invention is applied.

FIG. 1 is a view that illustrates the schematic configuration of a vehicle 10 to which the invention is applied. As shown in FIG. 1, the vehicle 10 includes an engine 12, drive wheels 14 and a power transmission system 16. The engine 12 functions as a driving force source for propelling the vehicle 10. The power transmission system 16 is provided between the engine 12 and the drive wheels 14. The power transmission system 16 includes a known torque converter 20, an input shaft 22, a known belt-type continuously variable transmission 24 (hereinafter, referred to as continuously variable transmission 24), a forward/reverse switching device 26, a gear mechanism 28, an output shaft 30, a counter shaft 32, a reduction gear unit 34, a differential gear 38, a pair of axles 40, and the like. The torque converter 20 serves as a fluid transmission device coupled to the engine 12 in a housing 18 that serves as a non-rotating member. The input shaft 22 is coupled to the torque converter 20. The continuously variable transmission 24 is coupled to the input shaft 22. The continuously variable transmission 24 serves as a continuously variable transmission mechanism. The forward/reverse switching device 26 is also coupled to the input shaft 22. The gear mechanism 28 is coupled to the input shaft 22 via the forward/reverse switching device 26. The gear mechanism 28 is provided in parallel with the continuously variable transmission 24. The gear mechanism 28 serves as a transmission mechanism. The output shaft 30 is an output rotating member common to the continuously variable transmission 24 and the gear mechanism 28. The reduction gear unit 34 is formed of a pair of gears that are respectively provided on the output shaft 30 and the counter shaft 32 so as to be relatively non-rotatable and that are in mesh with each other. The differential gear 38 is coupled to a gear 36. The gear 36 is provided on the counter shaft 32 so as to be relatively non-rotatable. The pair of axles 40 are coupled to the differential gear 38. In the thus configured power transmission system 16, the power of the engine 12 (when not specifically distinguished from one another, power is synonymous with torque and force) is transmitted to the pair of drive wheels 14 sequentially via the torque converter 20, the continuously variable transmission 24 (or the forward/reverse switching device 26 and the gear mechanism 28), the reduction gear unit 34, the differential gear 38, the axles 40, and the like.

In this way, the power transmission system 16 includes the continuously variable transmission 24 and the gear mechanism 28 provided in parallel with each other between the engine 12 (which synonymous with the input shaft 22 that is an input rotating member to which the power of the engine 12 is transmitted) and the drive wheels 14 (which is synonymous with the output shaft 30 that is an output rotating member that outputs the power of the engine 12 to the drive wheels 14). Thus, the power transmission system 16 includes a first power transmission path and a second power transmission path. The first power transmission path transmits the power of the engine 12 from the input shaft 22 to the drive wheels 14 side (that is, the output shaft 30) via the continuously variable transmission 24. The second power transmission path transmits the power of the engine 12 from the input shaft 22 to the drive wheels 14 side (that is, the output shaft 30) via the gear mechanism 28. The power transmission system 16 is configured to change the power transmission path between the first power transmission path and the second power transmission path on the basis of a traveling state of the vehicle 10. Therefore, the power transmission system 16 includes a CVT drive clutch C2, a forward clutch C1 and a reverse brake B1 as clutch mechanisms that selectively change the power transmission path, which transmits the power of the engine 12 to the drive wheels 14 side, between the first power transmission path and the second power transmission path. The CVT drive clutch C2 serves as a first clutch mechanism that connects or interrupts transmission of power in the first power transmission path. The forward clutch C1 and the reverse brake B1 serve as a second clutch mechanism that connects or interrupts transmission of power in the second power transmission path. The CVT drive clutch C2, the forward clutch C1 and the reverse brake B1 correspond to a separating device. Each of the CVT drive clutch C2, the forward clutch C1 and the reverse brake B1 is a known hydraulic friction engagement device (friction clutch) that is frictionally engaged by a hydraulic actuator. Each of the forward clutch C1 and the reverse brake B1 is one of elements that constitute the forward/reverse switching device 26 as will be described later.

The torque converter 20 is provided around the input shaft 22 coaxially with the input shaft 22. The torque converter 20 includes a pump impeller 20p and a turbine runner 20t. The pump impeller 20p is coupled to the engine 12. The turbine runner 20t is coupled to the input shaft 22. A mechanical oil pump 41 is coupled to the pump impeller 20p. The oil pump 41 generates hydraulic pressure by being rotationally driven by the engine 12. The hydraulic pressure is used to control a shift of the continuously variable transmission 24, generate a belt clamping force in the continuously variable transmission 24, change the operation of each of the clutch mechanisms, or supply lubricating oil to portions of the power transmission path of the power transmission system 16.

The forward/reverse switching device 26 is provided around the input shaft 22 coaxially with the input shaft 22. The forward/reverse switching device 26 is mainly formed of a double-pinion-type planetary gear train 26p, the forward clutch C1 and the reverse brake B1. A sun gear 26s of the planetary gear train 26p is integrally coupled to the input shaft 22. A ring gear 26r of the planetary gear train 26p is selectively coupled to the housing 18 via the reverse brake B1. A carrier 26c of the planetary gear train 26p is coupled to a small-diameter gear 42. The small-diameter gear 42 is provided around the input shaft 22 coaxially with the input shaft 22 so as to be relatively rotatable. The carrier 26c and the sun gear 26s are selectively coupled to each other via the forward clutch C1. In the thus configured forward/reverse switching device 26, when the forward clutch C1 is engaged and the reverse brake B1 is released, the planetary gear train 26p is integrally rotated, the small-diameter gear 42 is rotated at the same rotation speed as the input shaft 22, and a forward power transmission path is established (achieved) in the second power transmission path. When the reverse brake B1 is engaged and the forward clutch C1 is released, the small-diameter gear 42 is rotated in a direction opposite to the rotation direction of the input shaft 22, and a reverse power transmission path is established in the second power transmission path. When both the forward clutch C1 and the reverse brake B1 are released, the second power transmission path is set to a neutral state in which transmission of power is interrupted (power transmission interrupted state).

The gear mechanism 28 includes the small-diameter gear 42 and a large-diameter gear 46. The large-diameter gear 46 is provided on a gear mechanism counter shaft 44 so as to be relatively non-rotatable. The large-diameter gear 46 is in mesh with the small-diameter gear 42. Thus, the gear mechanism 28 is a transmission mechanism having one gear stage (speed stage). An idler gear 48 is provided around the gear mechanism counter shaft 44 coaxially with the gear mechanism counter shaft 44 so as to be relatively non-rotatable. The idler gear 48 is in mesh with an output gear 50 having a larger diameter than the idler gear 48. The output gear 50 is provided around the same rotation axis as that of the output shaft 30 so as to be relatively rotatable with respect to the output shaft 30.

A dog clutch D1 is further provided around the output shaft 30 between the output shaft 30 and the output gear 50. The dog clutch D1 selectively connects the output shaft 30 to the output gear 50 or disconnects the output shaft 30 from the output gear 50. Thus, the dog clutch D1 functions as a third clutch mechanism that is provided in the power transmission system 16 and that connects or interrupts transmission of power in the second power transmission path. Specifically, the dog clutch D1 includes a first gear 52, a second gear 54 and a hub sleeve 56. The first gear 52 is provided on the output shaft 30. The second gear 54 is provided integrally with the output gear 50. The hub sleeve 56 has internal teeth that are fittable (engageable, meshable) with these first gear 52 and second gear 54. In the thus configured dog clutch D1, when the hub sleeve 56 is fitted to these first gear 52 and second gear 54, the output shaft 30 and the output gear 50 are connected to each other. The dog clutch D1 includes a known synchromesh mechanism (not shown) that serves as a synchronization mechanism. The synchromesh mechanism synchronizes rotations at the time of fitting the first gear 52 to the second gear 54. When one of the forward clutch C1 and the reverse brake B1 is engaged and the dog clutch D1 is engaged, the second power transmission path is established (connected). In the second power transmission path, the power of the engine 12 is transmitted from the input shaft 22 to the output shaft 30 sequentially via the forward/reverse switching device 26, the gear mechanism 28, the idler gear 48 and the output gear 50.

The continuously variable transmission 24 is provided in a power transmission path between the input shaft 22 and the output shaft 30. The continuously variable transmission 24 includes a primary pulley 58, a secondary pulley 62 and a transmission belt 64. The primary pulley 58 is an input-side member provided on the input shaft 22, and has a variable effective diameter. The secondary pulley 62 is an output-side member provided on a rotary shaft 60 coaxial with the output shaft 30, and has a variable effective diameter. The transmission belt 64 is wound around the pair of variable pulleys 58, 62 so as to span between the pair of variable pulleys 58, 62. Power is transmitted via a friction force between the pair of variable pulleys 58, 62 and the transmission belt 64.

Figure 3:
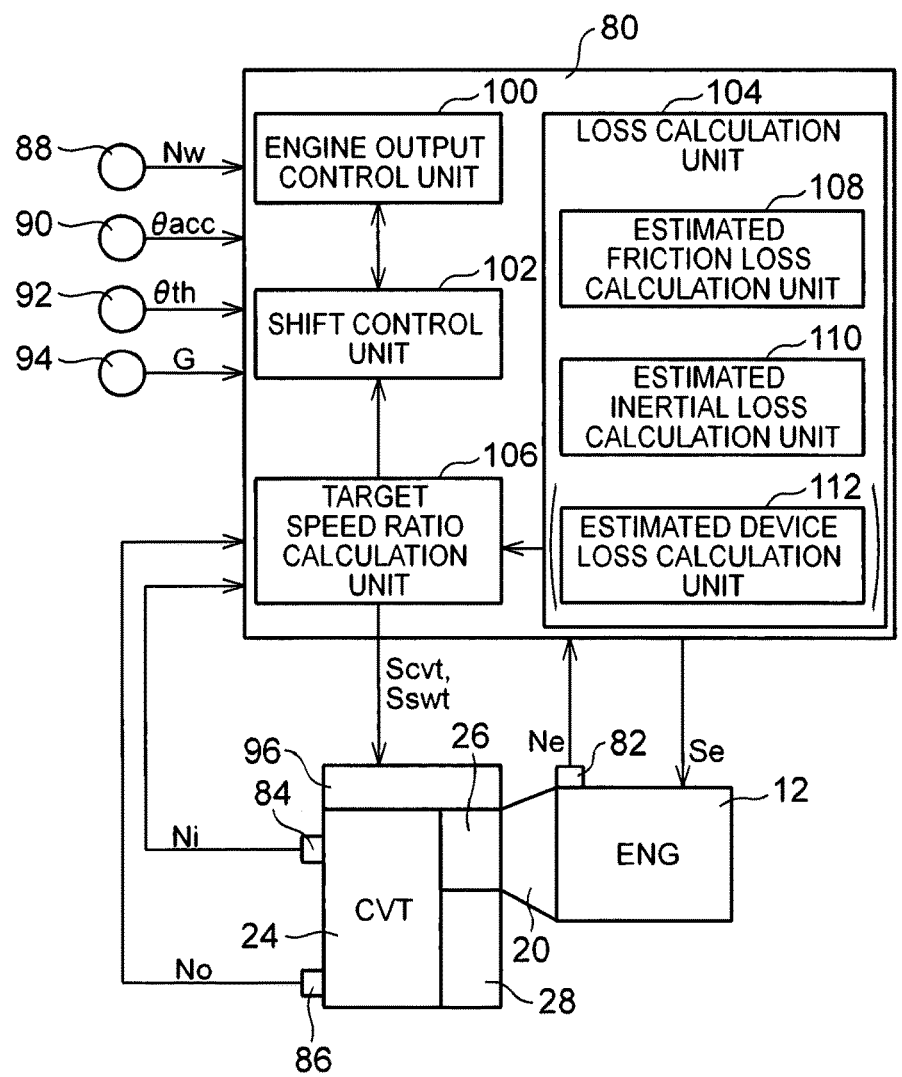
FIG. 3 is a view that illustrates a relevant portion of control functions and control system for various controls in the vehicle.

In the primary pulley 58, a primary thrust Win (=Primary pressure Pin×Pressure receiving area) in a primary pulley 58 for changing a V-groove width between sheaves is controlled by regulating the primary pressure Pin by using a hydraulic control circuit 96 (see FIG. 3). The primary pressure Pin is supplied to a primary hydraulic cylinder 58c. In the secondary pulley 62, a secondary thrust Wout (=Secondary pressure Pout×Pressure receiving area) in the secondary pulley 62 for changing a V-groove width between sheaves is controlled by regulating a secondary pressure Pout by using the hydraulic control circuit 96. The secondary pressure Pout is supplied to a secondary hydraulic cylinder 62c. When the primary thrust Win and the secondary thrust Wout each are controlled, the V-groove width of each of the pair of variable pulleys 58, 62 is changed while a slip of the transmission belt 64 is prevented, with the result that the winding diameter (effective diameter) of the transmission belt 64 is changed. A hydraulic pressure source that generates a source pressure of each of the primary pressure Pin and the secondary pressure Pout that are regulated by the hydraulic control circuit 96 is the oil pump 41. In this way, the oil pump 41 functions as a thrust source supply device that supplies a source of each of the primary thrust Win and the secondary thrust Wout.

In the continuously variable transmission 24, when the winding diameter of the transmission belt 64 is changed, a speed ratio (gear ratio) γ (=Input shaft rotation speed Ni/Output shaft rotation speed No) is continuously changed. For example, when the V-groove width of the primary pulley 58 is reduced, the speed ratio γ decreases (that is, the continuously variable transmission 24 upshifts). When the V-groove width of the primary pulley 58 is increased, the speed ratio γ increases (that is, the continuously variable transmission 24 downshifts). The CVT drive clutch C2 is provided on the drive wheels 14 side with respect to the continuously variable transmission 24 (that is, the CVT drive clutch C2 is provided between the secondary pulley 62 and the output shaft 30). The CVT drive clutch C2 selectively connects the secondary pulley 62 (rotary shaft 60) to the output shaft 30 or disconnects the secondary pulley 62 (rotary shaft 60) from the output shaft 30. When the CVT drive clutch C2 is engaged, the first power transmission path is established (connected). In the first power transmission path, the power of the engine 12 is transmitted from the input shaft 22 to the output shaft 30 via the continuously variable transmission 24.

Figure 2:
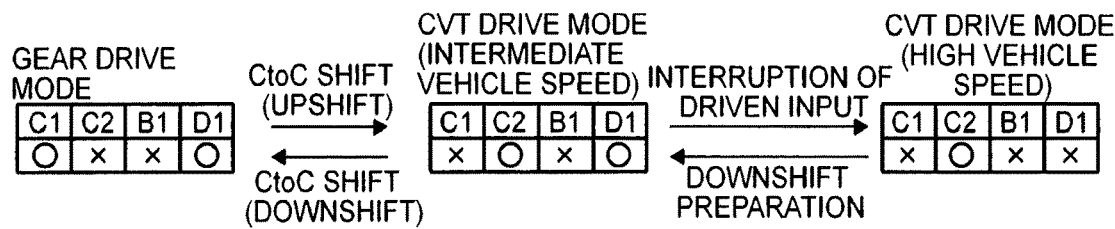
FIG. 2 is a view for illustrating changes in driving pattern of a power transmission system.

The operation of the power transmission system 16 will be described below. FIG. 2 is a view for illustrating changes in driving pattern of the power transmission system 16 by using an engagement chart of engagement elements for each driving pattern. In FIG. 2, C1 corresponds to the operation state of the forward clutch C1, C2 corresponds to the operation state of the CVT drive clutch C2, B1 corresponds to the operation state of the reverse brake B1, D1 corresponds to the operation state of the dog clutch D1, "O" indicates an engaged (connected) state, and "×" indicates a released (disconnected) state.

Initially, a gear drive mode (also referred to as gear transmission mode) that is the driving pattern in which the power of the engine 12 is transmitted to the output shaft 30 via the gear mechanism 28 (that is, the driving pattern in which the power transmission path is changed to the second power transmission path) will be described. In this gear drive mode, as shown in FIG. 2, for example, the forward clutch C1 and the dog clutch D1 are engaged, while the CVT drive clutch C2 and the reverse brake B1 are released.

Specifically, when the forward clutch C1 is engaged, the planetary gear train 26p is integrally rotated at the same rotation speed as the input shaft 22, so the mechanically coupled gear mechanism 28, gear mechanism counter shaft 44, idler gear 48 and output gear 50 are also rotated. Because the output gear 50 and the first gear 52 are connected to each other by engagement of the dog clutch D1, the output shaft 30 provided integrally with the first gear 52 is rotated. In this way, when the forward clutch C1 and the dog clutch D1 are engaged, the power of the engine 12 is transmitted to the output shaft 30 sequentially via the torque converter 20, the forward/reverse switching device 26, the gear mechanism 28, and the like. In this gear drive mode, for example, when the reverse brake B1 and the dog clutch D1 are engaged, and the CVT drive clutch C2 and the forward clutch C1 are released, reverse traveling is enabled.

Subsequently, a CVT drive mode (also referred to as CVT transmission mode) that is the driving pattern in which the power of the engine 12 is transmitted to the output shaft 30 via the continuously variable transmission 24 (that is, the driving pattern in which the power transmission path is changed to the first power transmission path) will be described. In this CVT drive mode, as shown in the CVT drive mode (high vehicle speed) of FIG. 2, for example, the CVT drive clutch C2 is engaged, while the forward clutch C1, the reverse brake B1 and the dog clutch D1 are released.

Specifically, when the CVT drive clutch C2 is engaged, the rotary shaft 60 and the output shaft 30 are connected to each other, so the secondary pulley 62 and the output shaft 30 are integrally rotated. In this way, when the CVT drive clutch C2 is engaged, the power of the engine 12 is transmitted to the output shaft 30 sequentially via the torque converter 20, the continuously variable transmission 24, and the like. The reason why the dog clutch D1 is released in the CVT drive mode (high vehicle speed) is to, for example, eliminate a drag of the gear mechanism 28, and the like, in the CVT drive mode and prevent high-speed rotation of the gear mechanism 28, and the like, at a high vehicle speed.

The gear drive mode is, for example, selected in a low vehicle speed region including a state during a stop of the vehicle. A speed ratio γ1 (that is a speed ratio EL that is established by the gear mechanism 28) in this second power transmission path is set to a value larger than (that is a speed ratio lower than) a maximum speed ratio (that is, the lowest speed ratio that is the lowest vehicle speed-side speed ratio) γmax that is established by the continuously variable transmission 24. For example, the speed ratio γ1 corresponds to a first-speed speed ratio γ1 that is the speed ratio of a first gear stage in the power transmission system 16, and the lowest speed ratio γmax of the continuously variable transmission 24 corresponds to a second-speed speed ratio γ2 that is the speed ratio of a second gear stage in the power transmission system 16. Therefore, for example, the gear drive mode and the CVT drive mode are changed in accordance with a shift line for changing between the first gear stage and the second gear stage in a shift map of a known stepped transmission. For example, in the CVT drive mode, a shift (for example, a CVT shift, and a continuously variable shift) is carried out. In this shift, the speed ratio γ is changed on the basis of a traveling state, such as an accelerator operation amount θacc and a vehicle speed V, by using a known method. In changing the driving pattern from the gear drive mode to the CVT drive mode (high vehicle speed) or changing the driving pattern from the CVT drive mode (high vehicle speed) to the gear drive mode, the change is carried out via a CVT drive mode (intermediate vehicle speed) shown in FIG. 2 transitionally.

For example, when the driving pattern is changed from the gear drive mode to the CVT drive mode (high vehicle speed), the driving pattern is transitionally changed from the gear drive mode to the CVT drive mode (intermediate vehicle speed). The gear drive mode is the state where the forward clutch C1 and the dog clutch D1 are engaged. The CVT drive mode (intermediate vehicle speed) is the state where the CVT drive clutch C2 and the dog clutch D1 are engaged. That is, a clutch engagement changing shift (for example, clutch-to-clutch shift (hereinafter, referred to as CtoC shift)) is carried out so as to release the forward clutch C1 and engage the CVT drive clutch C2. At this time, the power transmission path is changed from the second power transmission path to the first power transmission path, and the power transmission system 16 is substantially upshifted. After the power transmission path is changed, the dog clutch D1 is released in order to prevent an unnecessary drag or high-speed rotation of the gear mechanism 28, or the like (see interruption of driven input in FIG. 2). In this way, the dog clutch D1 functions as a driven input interrupting clutch that interrupts input from the drive wheels 14 side.

For example, when the driving pattern is changed from the CVT drive mode (high vehicle speed) to the gear drive mode, the driving pattern is transitionally changed from the CVT drive mode (high vehicle speed) to the CVT drive mode (intermediate vehicle speed) in preparation for changing the driving pattern to the gear drive mode (see downshift preparation in FIG. 2). The CVT drive mode (high vehicle speed) is the state where the CVT drive clutch C2 is engaged. The CVT drive mode (intermediate vehicle speed) is the state where the CVT drive clutch C2 is engaged and the dog clutch D1 is further engaged. In the CVT drive mode (intermediate vehicle speed), rotation is also transmitted to the carrier 26c of the planetary gear train 26p via the gear mechanism 28. When a clutch engagement changing shift (for example, CtoC shift) is carried out so as to release the CVT drive clutch C2 and engage the forward clutch C1 from the state of the CVT drive mode (intermediate vehicle speed), the driving pattern is changed to the gear drive mode. At this time, the power transmission path is changed from the first power transmission path to the second power transmission path, and the power transmission system 16 is substantially downshifted.

FIG. 3 is a view that illustrates a relevant portion of control functions and control system for various controls in the vehicle 10. As shown in FIG. 3, the vehicle 10 includes an electronic control unit (ECU) 80 including, for example, a control unit for the vehicle 10. The control unit changes the driving pattern of the power transmission system 16. Thus, FIG. 3 is a view that shows input/output lines of the electronic control unit 80, and is a functional block diagram that illustrates a relevant portion of control functions implemented by the electronic control unit 80. The electronic control unit 80 includes a so-called microcomputer. The microcomputer includes, for example, a CPU, a RAM, a ROM, input/output interfaces, and the like. The CPU executes various controls over the vehicle 10 by executing signal processing in accordance with programs prestored in the ROM while utilizing a temporary storage function of the RAM. For example, the electronic control unit 80 is configured to execute output control over the engine 12, shift control and belt clamping force control over the continuously variable transmission 24, control for changing the driving pattern, and the like. Where necessary, the electronic control unit 80 is split into an electronic control unit for controlling the engine, an electronic control unit for controlling a shift, and the like.

Various actual values based on detection signals of various sensors of the vehicle 10 are supplied to the electronic control unit 80. The various sensors include, for example, various rotation speed sensors 82, 84, 86, 88, an accelerator operation amount sensor 90, a throttle valve opening degree sensor 92, a G sensor 94, and the like. The various actual values include, for example, an engine rotation speed Ne, an input shaft rotation speed Ni, an output shaft rotation speed No, a wheel speed Nw, an accelerator operation amount $\theta acc$, a throttle valve opening degree $\theta th$, a longitudinal acceleration G of the vehicle 10, and the like. The input shaft rotation speed Ni is the rotation speed of the input shaft 22 (primary pulley 58), which corresponds to an input shaft angular velocity $\omega i$. The output shaft rotation speed No is the rotation speed of the rotary shaft 60 (secondary pulley 62), which corresponds to an output shaft angular velocity $\omega o$. The wheel speed Nw is the rotation speed of one of the drive wheels 14, which corresponds to the vehicle speed V. The accelerator operation amount $\theta acc$ is the operation amount of an accelerator pedal as a driver's acceleration request amount.

An engine output control command signal Se, a hydraulic control command signal Scvt, a hydraulic control command signal Sswt, and the like, are output from the electronic control unit 80. The engine output control command signal Se is used to control the output of the engine 12. The hydraulic control command signal Scvt is used to control hydraulic pressure associated with a shift of the continuously variable transmission 24. The hydraulic control command signal Sswt is used to control the forward/reverse switching device 26, the CVT drive clutch C2 and the dog clutch D1 associated with a change of the driving pattern of the power transmission system 16. Specifically, a throttle driving signal, a fuel injection signal, an ignition timing signal, and the like, are output as the engine output control command signal Se. A command signal for driving a solenoid valve that regulates the primary pressure Pin, a command signal for driving a solenoid valve that regulates the secondary pressure Pout, and the like, are output to the hydraulic control circuit 96 as the hydraulic control command signal Scvt. Command signals, and the like, for respectively driving solenoid valves that control hydraulic pressures that are supplied to the forward clutch C1, the reverse brake B1, the CVT drive clutch C2, the actuator for actuating the hub sleeve 56, and the like, are output to the hydraulic control circuit 96 as the hydraulic control command signal Sswt.

The electronic control unit 80 includes an engine output control unit 100, that is, engine output control means, and a shift control unit 102, that is, shift control means.

The engine output control unit 100, for example, outputs the engine output control command signal Se to the throttle actuator, the fuel injection device and the ignition device in order to control the output of the engine 12. The engine output control unit 100, for example, calculates a required driving force Fdem as a driver's driving request amount on the basis of the actual accelerator operation amount $\theta acc$ and the actual vehicle speed V by using a correlation (driving force map) (not shown) empirically obtained or obtained by design and stored in advance (that is, predetermined). The engine output control unit 100 sets a target engine torque Tetgt for obtaining the required driving force Fdem. The engine output control unit 100 controls not only the open/close of the electronic throttle valve by the throttle actuator but also the fuel injection amount by the fuel injection device and the ignition timing by the ignition device so that the target engine torque Tetgt is obtained. Not only the required driving force Fdem [N] of the drive wheels 14 but also a required driving torque [Nm] of the drive wheels 14, a required driving power [W] of the drive wheels 14, a required output torque [Nm] of the output shaft 30, a required engine torque [Nm], and the like, may be used as the driving request amount. The accelerator operation amount θacc[%], the throttle valve opening degree θth[%], an intake air amount [g/sec] of the engine 12, or the like, may be simply used as the driving request amount.

In the CVT drive mode, the shift control unit 102 outputs the hydraulic control command signal Scvt to the hydraulic control circuit 96 so that the speed ratio γ becomes a target speed ratio γtgt. The hydraulic control command signal Scvt is used to control the speed ratio γ of the continuously variable transmission 24. The target speed ratio γtgt is calculated on the basis of the accelerator operation amount θacc, the vehicle speed V, and the like. Specifically, the shift control unit 102 has a predetermined correlation (for example, a CVT shift map, a belt clamping force map) by which the target speed ratio γtgt of the continuously variable transmission 24 is achieved while a belt slip of the continuously variable transmission 24 does not occur. The target speed ratio γtgt is set so that the operating point of the engine 12 is on a predetermined optimal line (for example, an engine optimal fuel consumption line). The shift control unit 102 determines a primary command pressure Pintgt and a secondary command pressure Pouttgt on the basis of the accelerator operation amount θacc, the vehicle speed V, and the like, by using the above correlation. The primary command pressure Pintgt is a command value of the primary pressure Pin. The secondary command pressure Pouttgt is a command pressure of the secondary pressure Pout. The shift control unit 102 outputs the primary command pressure Pintgt and the secondary command pressure Pouttgt to the hydraulic control circuit 96, and carries out a CVT shift.

The shift control unit 102 controls a change of the driving pattern between the gear drive mode and the CVT drive mode. Specifically, the shift control unit 102 determines whether to change the driving pattern in which the vehicle is traveling. For example, the shift control unit 102 determines whether to shift (change the speed ratio) on the basis of the vehicle speed V and the accelerator operation amount θacc by using an upshift line and a downshift line for changing the speed ratio between the first-speed speed ratio γ1 and the second-speed speed ratio γ2. The shift control unit 102 determines whether to change the driving pattern in which the vehicle is traveling on the basis of the determined result. The first-speed speed ratio corresponds to the speed ratio EL in the gear drive mode. The second-speed speed ratio corresponds to the lowest speed ratio γmax in the CVT drive mode. The upshift line and the downshift line are, for example, predetermined shift lines, and have a predetermined hysteresis.

When the shift control unit 102 determines to change the driving pattern, the shift control unit 102 changes the driving pattern. For example, when the shift control unit 102 determines to upshift in the gear drive mode, the shift control unit 102 changes the driving pattern from the gear drive mode to the CVT drive mode (high vehicle speed). When the shift control unit 102 changes the driving pattern from the gear drive mode to the CVT drive mode (high vehicle speed), the shift control unit 102 initially carries out an upshift through a CtoC shift for releasing the forward clutch C1 and engaging the CVT drive clutch C2. This state corresponds to the CVT drive mode (intermediate vehicle speed) to which the driving pattern is transitionally changed in FIG. 2. The power transmission path in the power transmission system 16 is changed from the second power transmission path, through which power is transmitted via the gear mechanism 28, to the first power transmission path, through which power is transmitted via the continuously variable transmission 24. Subsequently, the shift control unit 102 changes the driving pattern to the CVT drive mode (high vehicle speed) by outputting a command to actuate the hub sleeve 56 so that the engaged dog clutch D1 is released. The hub sleeve 56 is driven by the hydraulic actuator (not shown), and a pressing force that is applied to the hub sleeve 56 is adjusted by a hydraulic pressure that is supplied to the hydraulic actuator.

When the shift control unit 102 determines to downshift in the CVT drive mode (high vehicle speed), the shift control unit 102 changes the driving pattern from the CVT drive mode (high vehicle speed) to the gear drive mode. When the shift control unit 102 changes the driving pattern from the CVT drive mode (high vehicle speed) to the gear drive mode, the shift control unit 102 initially changes the driving pattern to the CVT drive mode (intermediate vehicle speed) by outputting a command to actuate the hub sleeve 56 so that the released dog clutch D1 is engaged. Subsequently, the shift control unit 102 carries out a downshift through a CtoC shift for releasing the CVT drive clutch C2 and engaging the forward clutch C1. This state corresponds to the gear drive mode in FIG. 2. The power transmission path in the power transmission system 16 is changed from the first power transmission path, through which power is transmitted via the continuously variable transmission 24, to the second power transmission path, through which power is transmitted via the gear mechanism 28. In this way, when the shift control unit 102 changes transmission of power from transmission of power via the continuously variable transmission 24 to transmission of power via the gear mechanism 28 while the vehicle 10 is traveling, the dog clutch D1 is actuated to an engaged side and then the CVT drive clutch C2 is released.

In control for transitionally changing the driving pattern to the CVT drive mode (intermediate vehicle speed) as described above, the first power transmission path and the second power transmission path are changed only by exchanging torque through a CtoC shift. Therefore, a change shock is suppressed.

Incidentally, in the gear drive mode, the continuously variable transmission 24 idles with rotation of the primary pulley 58 coupled to the input shaft 22 in a state where the rotary shaft 60 is separated from the output shaft 30. A reduction in the loss of the idling continuously variable transmission 24 leads to improvement in fuel economy. During a change of the driving pattern from the gear drive mode to the CVT drive mode (intermediate vehicle speed), the speed ratio γ of the continuously variable transmission 24 is desirably set to the target speed ratio γtgt that is calculated as in the case of, for example, the CVT drive mode in terms of continuity in the CVT drive mode. However, there is a case where controlling the continuously variable transmission 24 at the target speed ratio γtgt in the gear drive mode as in the case of the CVT drive mode does not reduce the loss of the continuously variable transmission 24. Therefore, the shift control unit 102 changes the driving pattern from the gear drive mode to the CVT drive mode (intermediate vehicle speed), for example, in a state where the speed ratio γ of the continuously variable transmission 24 is set to the target speed ratio γtgt that is calculated as in the case of the CVT drive mode. However, in the gear drive mode, the speed ratio γ is set to the speed ratio γ at which the loss of the continuously variable transmission 24 is reduced as much as possible.

Therefore, the electronic control unit 80 further includes a loss calculation unit 104, that is, loss calculation means, and a target speed ratio calculation unit 106, that is, target speed ratio calculation means.

The loss calculation unit 104 includes an estimated friction loss calculation unit 108, that is, estimated friction loss calculation means, and an estimated inertial loss calculation unit 110, that is, estimated inertial loss calculation means. The estimated friction loss calculation unit 108 calculates an estimated friction loss Tlfp. The estimated friction loss Tlfp is an estimated value of a friction loss Tlf [Nm] of the continuously variable transmission 24. The estimated inertial loss calculation unit 110 calculates an estimated inertial loss Tlip. The estimated inertial loss Tlip is an estimated value of an inertial loss Tli [Nm] of the continuously variable transmission 24. The friction loss Tlf includes, for example, a friction loss torque between the transmission belt 64 and each of the pulleys 58, 62 in the continuously variable transmission 24, and may include a belt internal loss torque due to friction between rings and elements that constitute the transmission belt 64. The inertial loss Tli is, for example, an inertial loss torque that is generated during acceleration by the moment of inertia of idling members of the continuously variable transmission 24 in an idling state in the gear drive mode. Particularly, the inertial loss of the secondary pulley 62 changes with the speed ratio γ of the continuously variable transmission 24. Therefore, in the present embodiment, in order to obtain the speed ratio γ at which the loss of the continuously variable transmission 24 is reduced as much as possible, the inertial loss of the secondary pulley 62, which depends on the speed ratio γ, is described as the inertial loss Tli.

The estimated friction loss calculation unit 108 calculates the estimated friction loss Tlfp on the basis of the speed ratio γ of the continuously variable transmission 24 by using a predetermined schematic mathematical expression for calculating the friction loss Tlf of the continuously variable transmission 24 as expressed by the following mathematical expression (1). In the following mathematical expression (1), C denotes a predetermined friction loss calculation coefficient, and may be, for example, a constant value or may be a value that is increased as the input torque Ti of the continuously variable transmission 24 increases.

$$Tlfp = C \times |\log \gamma| \quad (1)$$

The estimated inertial loss calculation unit 110 calculates the estimated inertial loss Tlip on the basis of the speed ratio γ of the continuously variable transmission 24 and an angular acceleration (input shaft angular acceleration) dωi/dt [rad/s$^2$] of the input shaft 22 by using a predetermined arithmetic expression for calculating the inertial loss of the secondary pulley 62 as expressed by the following mathematical expression (2). In the following mathematical expression (2), Is denotes the predetermined moment of inertia of the secondary pulley 62. The input shaft angular acceleration dωi/dt is the time rate of change in the rotation speed of the input shaft 22, and a time derivative, that is, a time rate of change, is indicated with a dot in the graph (the same applies to the following description).

$$Tlip = Is \times (1 \div \gamma)^2 \times (d\omega i/dt) \quad (2)$$

The loss calculation unit 104 calculates a total loss Tlt of the continuously variable transmission 24 in the gear drive mode from the sum of the estimated friction loss Tlfp and the estimated inertial loss Tlip as expressed by the following mathematical expression (3).

$$Tlt = Tlfp + Tlip \quad (3)$$

In the mathematical expression (3), the estimated friction loss Tlfp that is the first term on the right-hand side monotonously decreases as the speed ratio γ increases in the range of the speed ratio γ from the minimum speed ratio (that is, the highest speed ratio that is the highest vehicle speed-side speed ratio) γmin to "1". The minimum speed ratio γmin is established by the continuously variable transmission 24. The estimated friction loss Tlfp monotonously increases as the speed ratio γ increases in the range of the speed ratio γ from "1" to the lowest speed ratio γmax. On the other hand, the estimated inertial loss Tlip that is the second term on the right-hand side monotonously decreases as the speed ratio γ increases. Thus, in the range from the highest speed ratio γmin to "1", the speed ratio γ that minimizes the total loss Tlt of the continuously variable transmission 24 is "1". In contrast, in the range of the speed ratio γ from "1" to the lowest speed ratio γmax, the speed ratio γ that minimizes the total loss Tlt of the continuously variable transmission 24 changes depending on the value of the input shaft angular acceleration dωi/dt.

Figure 4:
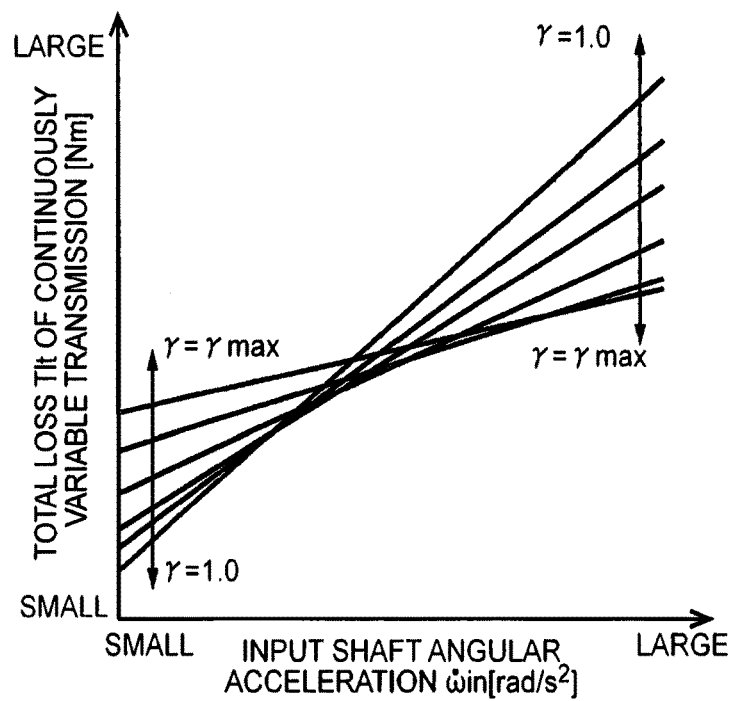
FIG. 4 is a graph that shows the correlation between an input shaft angular acceleration and a total loss torque of a continuously variable transmission with a speed ratio as a parameter.

FIG. 4 is a graph that shows the correlation between the input shaft angular acceleration dωi/dt and the total loss Tlt of the continuously variable transmission 24 with the speed ratio γ ranging from "1" to the lowest speed ratio γmax as a parameter so as to reflect the mathematical expression (3). FIG. 4 shows a tendency that, when the input shaft angular acceleration dωi/dt is relatively small, the total loss Tlt decreases as the speed ratio γ gets close to "1", that is, the speed ratio γ provides a high vehicle speed, and, when the input shaft angular acceleration dωi/dt is relatively large, the total loss Tlt decreases as the speed ratio γ gets close to the lowest speed ratio γmax, that is, the speed ratio γ provides a low vehicle speed.

The target speed ratio calculation unit 106, for example, sets the speed ratio γ of the continuously variable transmission 24 for minimizing the total loss Tlt of the continuously variable transmission 24 to the target speed ratio γtgt of the idling continuously variable transmission 24 on the basis of the input shaft angular acceleration dωi/dt. The total loss Tlt of the continuously variable transmission 24 is the sum of the estimated friction loss Tlfp of the continuously variable transmission 24 and the estimated inertial loss Tlip of the continuously variable transmission 24. In this way, the target speed ratio calculation unit 106 calculates the target speed ratio γtgt of the idling continuously variable transmission 24 on the basis of the estimated friction loss Tlfp and the estimated inertial loss Tlip.

For implementation into the electronic control unit 80, instead of employing the above-described embodiment in which the loss calculation unit 104 and the target speed ratio calculation unit 106 are provided, and the target speed ratio γtgt is calculated by the target speed ratio calculation unit 106 on the basis of the total loss Tlt calculated by the loss calculation unit 104, an alternative embodiment may be employed. In the alternative embodiment, the loss calculation unit 104 is not provided, and the target speed ratio γtgt is calculated by the target speed ratio calculation unit 106 by using a predetermined correlation (map). Hereinafter, the alternative embodiment will be described.

Figure 5:
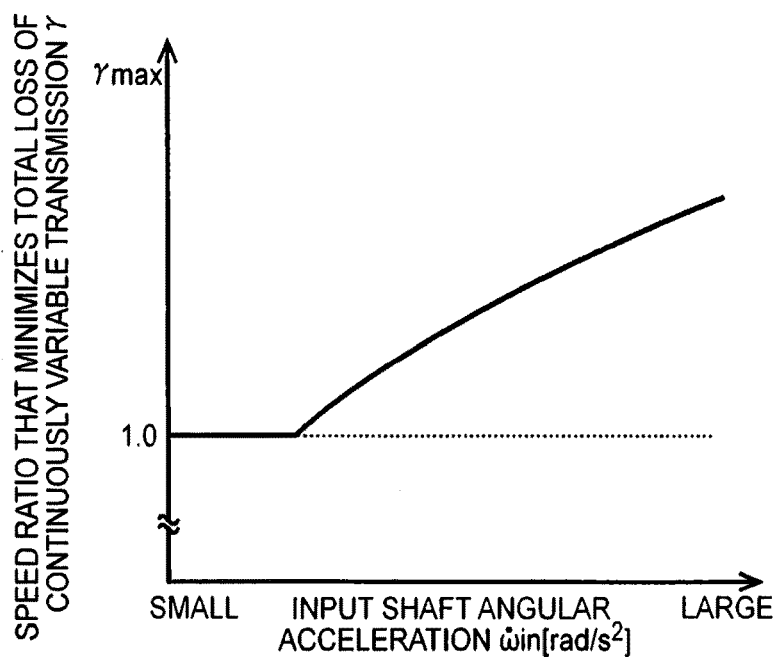
FIG. 5 is a graph that shows the correlation between an input shaft angular acceleration and a speed ratio that minimizes a total loss.

FIG. 5 is a graph in which the speed ratios γ that minimize the total loss Tlt in FIG. 4 are selected and plotted. That is, FIG. 5 is a graph that shows the correlation between the input shaft angular acceleration dωi/dt and the speed ratio γ that minimizes the total loss Tlt. FIG. 5 shows a tendency that the speed ratio γ that minimizes the total loss Tlt is smaller in the case where the input shaft angular acceleration dωi/dt is small than in the case where the input shaft angular acceleration dωi/dt is large. If the friction loss calculation coefficient C in the following mathematical expression (1) is changed in accordance with the input torque Ti of the continuously variable transmission 24, the correlation graph shown in FIG. 5 is also changed in accordance with the input torque Ti.

The target speed ratio calculation unit 106 calculates the target speed ratio γtgt of the idling continuously variable transmission 24 on the basis of the input shaft angular acceleration dωi/dt by using the correlation shown in FIG. 5. The correlation shown in FIG. 5 is predetermined such that the speed ratio γ of the continuously variable transmission 24 for minimizing the total loss Tlt of the continuously variable transmission 24 provides a higher vehicle speed in the case where the input shaft angular acceleration dωi/dt is small than in the case where the input shaft angular acceleration dωi/dt is large. The target speed ratio calculation unit 106, for example, calculates the input shaft angular acceleration dωi/dt on the basis of an estimated input torque Tip by using a predetermined arithmetic expression shown in the following mathematical expression (4). The estimated input torque Tip is an estimated value of the input torque Ti of the continuously variable transmission 24. In the following mathematical expression (4), Ieq is an equivalent moment of inertia of the vehicle 10, including the inertial system of the rotating members. The target speed ratio calculation unit 106, for example, calculates an estimated value Tep of the engine torque Te (estimated engine torque) on the basis of the engine rotation speed Ne, the throttle valve opening degree θth, and the like, by using a predetermined correlation (for example, an engine torque map), and calculates the estimated input torque Tip by multiplying the estimated engine torque Tep by a torque ratio t (=Turbine torque/Pump torque) of the torque converter 20. The torque ratio t is a function of a speed ratio e (=Turbine rotation speed (Input shaft rotation speed Ni)/Pump rotation speed (Engine rotation speed Ne)) of the torque converter. The target speed ratio calculation unit 106, for example, calculates the torque ratio t on the basis of the actual speed ratio e by using a predetermined correlation (map) between the speed ratio e and the torque ratio t.

$$\omega i/dt = Tip \div Ieq \quad (4)$$

In any one of the embodiment in which the loss calculation unit 104 is provided and the alternative embodiment in which the loss calculation unit 104 is not provided, when the power transmission path of the power transmission system 16 is the second power transmission path, the shift control unit 102 controls the continuously variable transmission 24 at the target speed ratio γtgt of the idling continuously variable transmission 24. The target speed ratio γtgt of the idling continuously variable transmission 24 is calculated by the target speed ratio calculation unit 106. Thus, when the power transmission path of the power transmission system 16 is the second power transmission path, the shift control unit 102 controls the continuously variable transmission 24 at the speed ratio γ that provides a higher vehicle speed in the case where the input shaft angular acceleration dωi/dt is small than in the case where the input shaft angular acceleration dωi/dt is large.

When the power transmission path of the power transmission system 16 is the second power transmission path, the shift control unit 102 controls the continuously variable transmission 24 at the target speed ratio γtgt of the idling continuously variable transmission 24 until the shift control unit 102 determines to change the power transmission path to the first power transmission path. On the other hand, for example, when the shift control unit 102 determines to change the power transmission path to the first power transmission path, the shift control unit 102 controls the continuously variable transmission 24 at the target speed ratio γtgt. The target speed ratio γtgt is calculated on the basis of the accelerator operation amount θacc, the vehicle speed V, and the like, as in the case of the CVT drive mode. Determination to change the power transmission path to the first power transmission path by the shift control unit 102 is made before the change is actually carried out, so the determination, for example, corresponds to an advance notice to change the power transmission path from the second power transmission path to the first power transmission path (advance notice to change the driving pattern from the gear drive mode to the CVT drive mode).

Figure 6:
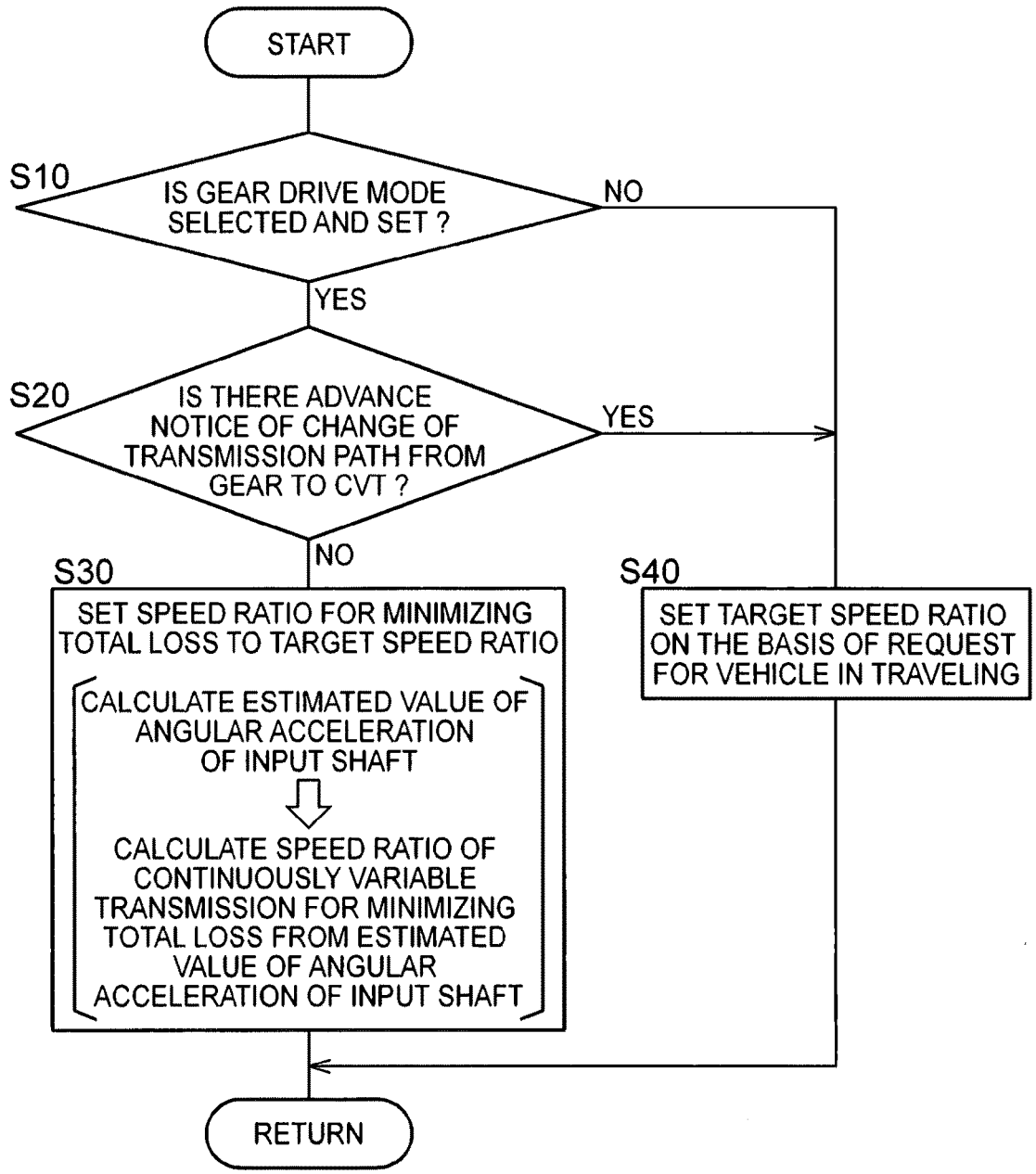
FIG. 6 is a flowchart that illustrates a relevant portion of control operations of an electronic control unit, that is, control operations for appropriately reducing a loss of the idling continuously variable transmission.
Figure 7:
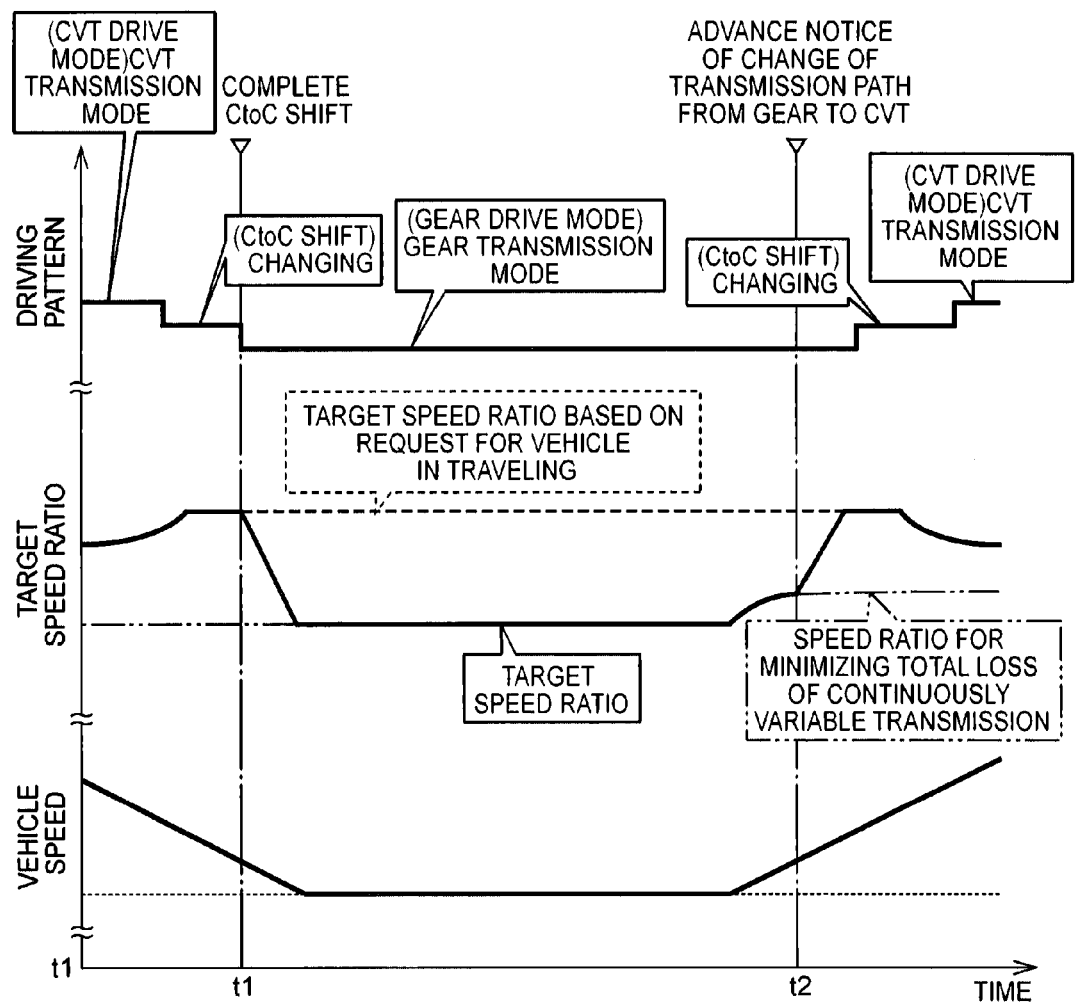
FIG. 7 is a time chart in the case where the control operations shown in the flowchart of FIG. 6 are executed.

FIG. 6 is a flowchart that illustrates a relevant portion of control operations of the electronic control unit 80, that is, control operations for appropriately reducing the loss of the idling continuously variable transmission 24. The flowchart is, for example, repeatedly executed at an extremely short cycle time of about several milliseconds to several tens of milliseconds. FIG. 7 is one example of a time chart in the case where the control operations shown in the flowchart of FIG. 6 are executed, and is one example at the time when the vehicle decelerates, stops, starts, and accelerates.

In FIG. 6, initially, in step (hereinafter, step is omitted) S10 corresponding to the shift control unit 102, for example, it is determined, on the basis of the command signal to the hydraulic control circuit 96, whether the power transmission path of the power transmission system 16 is the second power transmission path, that is, whether the gear transmission mode is selected and set. When affirmative determination is made in S10, in S20 corresponding to the shift control unit 102, for example, whether there is an advance notice to change the driving pattern from the gear drive mode to the CVT drive mode is determined on the basis of whether it is determined to change the power transmission path from the second power transmission path to the first power transmission path. When negative determination is made in S20, in S30 corresponding to the target speed ratio calculation unit 106, for example, the speed ratio γ of the continuously variable transmission 24 for minimizing the total loss Tlt of the continuously variable transmission 24 is set to the target speed ratio γtgt of the idling continuously variable transmission 24. Specifically, an estimated value of the input shaft angular acceleration dωi/dt is calculated by using the mathematical expression (4). The speed ratio γ of the continuously variable transmission 24 for minimizing the total loss Tlt of the continuously variable transmission 24 is calculated on the basis of the estimated value of the input shaft angular acceleration dωi/dt by using the predetermined correlation shown in FIG. 5, and the speed ratio γ is set to the target speed ratio γtgt of the idling continuously variable transmission 24. On the other hand, when negative determination is made in S10 or when affirmative determination is made in S20, in S40 corresponding to the shift control unit 102, for example, the target speed ratio γtgt is calculated (set) on the basis of a request for the vehicle in traveling (that is, the accelerator operation amount θacc, the vehicle speed V, and the like). Negative determination is made in S10, for example, when the CVT transmission mode is set, when the driving pattern is being changed from the CVT drive mode to the gear transmission mode, when the power transmission path is in a neutral state, when a reverse traveling mode is selected, or the like.

In FIG. 7, during deceleration of the vehicle 10, the driving pattern is changed from the CVT transmission mode to the gear transmission mode before a stop of the vehicle. The t1 timing indicates the timing at which the above change has completed. After the vehicle starts moving in the gear transmission mode, the driving pattern is changed from the gear transmission mode to the CVT transmission mode on the basis of the traveling state. The t2 timing indicates the timing at which determination (advance notice) as to the above change is made. As shown in the flowchart of FIG. 6, when the gear transmission mode is set and there is no advance notice of a change of the driving pattern from the gear transmission mode to the CVT transmission mode, the target speed ratio γtgt of the continuously variable transmission 24 is set on the basis of the speed ratio γ of the continuously variable transmission 24 for minimizing the total loss Tlt of the continuously variable transmission 24 (see the t1 timing to the t2 timing). In a case other than the above case, the target speed ratio γtgt of the continuously variable transmission 24 is set on the basis of the target speed ratio γtgt that is calculated on the basis of the request for the vehicle in traveling (see before the t1 timing and after the t2 timing).

As described above, according to the present embodiment, when the power transmission path of the power transmission system 16 is the second power transmission path, the continuously variable transmission 24 is controlled at the speed ratio γ that provides a higher vehicle speed in the case where the input shaft angular acceleration dωi/dt is small than in the case where the input shaft angular acceleration dωi/dt is large. Therefore, when the power transmission path is the second power transmission path, it is possible to control the speed ratio γ of the continuously variable transmission 24 to the speed ratio γ that reflects the inertial loss Tli of the continuously variable transmission 24. The inertial loss Tli changes with the input shaft angular acceleration dωi/dt. Thus, in the vehicle 10 including the continuously variable transmission 24 and the gear mechanism 28 provided in parallel with each other between the input shaft 22 and the output shaft 30, it is possible to appropriately reduce the loss of the idling continuously variable transmission 24.

According to the present embodiment, when the power transmission path of the power transmission system 16 is the second power transmission path, the idling continuously variable transmission 24 is controlled at the target speed ratio γtgt calculated on the basis of the estimated friction loss Tlfp and the estimated inertial loss Tlip. Therefore, when the power transmission path of the power transmission system 16 is the second power transmission path, it is possible to control the speed ratio γ of the continuously variable transmission 24 to the target speed ratio γtgt that reflects the friction loss Tlf of the continuously variable transmission 24 and the inertial loss Tli of the continuously variable transmission 24.

According to the present embodiment, the target speed ratio γtgt of the idling continuously variable transmission 24 is the speed ratio γ of the continuously variable transmission 24 for minimizing the total loss Tlt that is the sum of the estimated friction loss Tlfp and the estimated inertial loss Tlip. Therefore, when the power transmission path of the power transmission system 16 is the second power transmission path, the total loss Tlt of the idling continuously variable transmission 24 is reduced as much as possible. Thus, fuel economy is improved.

According to the present embodiment, when the power transmission path of the power transmission system 16 is the second power transmission path, the continuously variable transmission 24 is controlled at the target speed ratio γtgt of the idling continuously variable transmission 24 until it is determined to change the power transmission path to the first power transmission path. Therefore, when it is determined to change the power transmission path to the first power transmission path, it is possible to prohibit control of the idling continuously variable transmission 24 at the target speed ratio γtgt, and control the continuously variable transmission 24 at the target speed ratio γtgt that is calculated as in the case of the CVT drive mode in preparation for a change of the power transmission path to the first power transmission path. Thus, it is possible to give a higher priority to drivability, such as suppression of a change shock, than to fuel economy.

According to the present embodiment, the speed ratio γ of the continuously variable transmission 24 for minimizing the total loss Tlt of the continuously variable transmission 24 is calculated on the basis of the estimated value of the input shaft angular acceleration dωi/dt by using the predetermined correlation shown in FIG. 5, and the speed ratio γ is set to the target speed ratio γtgt of the idling continuously variable transmission 24. When the power transmission path of the power transmission system 16 is the second power transmission path, the continuously variable transmission 24 is controlled at the target speed ratio γtgt of the idling continuously variable transmission 24. Therefore, when the power transmission path of the power transmission system 16 is the second power transmission path, the speed ratio γ of the idling continuously variable transmission 24 is controlled to the target speed ratio γtgt at which the total loss Tlt of the continuously variable transmission 24 is reduced as much as possible. Thus, fuel economy is improved.

The embodiments of the invention are described in detail with reference to the drawings; however, the invention is also applicable to other alternative embodiments.

For example, in the above-described embodiments, the loss that changes with the speed ratio γ of the continuously variable transmission 24 includes not only the friction loss Tlf or the inertial loss Tli but also a device loss Tlp of the oil pump 41 that supplies the source of the primary thrust Win and secondary thrust Wout. The device loss Tlp changes with the speed ratio γ. Therefore, as shown in FIG. 3, the loss calculation unit 104 may further include an estimated device loss calculation unit 112, that is, estimated device loss calculation means. The estimated device loss calculation unit 112 calculates an estimated device loss Tlpp that is an estimated value of the device loss Tlp of the oil pump 41. In such a case, the target speed ratio calculation unit 106 calculates the target speed ratio γtgt of the idling continuously variable transmission 24 on the basis of the estimated friction loss Tlfp, the estimated inertial loss Tlip and the estimated device loss Tlpp. Alternatively, as shown in FIG. 5, the device loss Tlp may be incorporated in the correlation between the input shaft angular acceleration dωi/dt and the speed ratio γ that minimizes the total loss Tlt. With this configuration, when the power transmission path of the power transmission system 16 is the second power transmission path, it is possible to control the speed ratio γ of the continuously variable transmission 24 to the target speed ratio γtgt that reflects the friction loss Tlf of the continuously variable transmission 24, the inertial loss Tli of the continuously variable transmission 24 and the device loss Tlp of the oil pump 41. Thus, it is possible to further appropriately reduce the loss of the idling continuously variable transmission 24.

In the above-described embodiments, determination to change the power transmission path to the first power transmission path by the shift control unit 102 corresponds to an advance notice to change the driving pattern from the gear drive mode to the CVT drive mode. The advance notice of the change may be, for example, determination as to a traveling state close to the traveling state where change determination is made by the shift control unit 102, other than the above change determination. For example, when the vehicle enters a predetermined traveling state where it is determined that the vehicle enters a traveling state where change determination is made as a result of an increase in the vehicle speed V, or the like, if the vehicle continues traveling, the advance notice of the change may be issued.

In the above-described embodiments, when an advance notice of a change of the driving pattern from the gear transmission mode to the CVT transmission mode is issued while the gear transmission mode is set, the target speed ratio γtgt of the continuously variable transmission 24 is set on the basis of a request for the vehicle in traveling; however, the invention is not limited to this configuration. For example, the target speed ratio γtgt of the continuously variable transmission 24 in this case may be set to a constant value, such as the lowest speed ratio γmax closest to the speed ratio in the gear drive mode and a speed ratio γ close to the lowest speed ratio γmax. Alternatively, while the gear transmission mode is set, until the driving pattern is actually changed from the gear transmission mode to the CVT transmission mode, the speed ratio γ of the continuously variable transmission 24 for minimizing the total loss Tlt of the continuously variable transmission 24 may be set to the target speed ratio γtgt of the idling continuously variable transmission 24. In such a case, S20 in the flowchart of FIG. 6 is not executed. Therefore, steps may be changed as needed without any difficulty. For example, S20 in the flowchart of FIG. 6 may be omitted.

In the above-described embodiments, the gear mechanism 28 is the transmission mechanism having a single gear stage; however, the gear mechanism 28 is not limited to this configuration. For example, the gear mechanism 28 may be a transmission mechanism having a plurality of gear stages with different speed ratios γ. That is, the gear mechanism 28 may be a stepped transmission that is shifted into two or more stages.

In the above-described embodiments, in terms of the speed ratio γ, the gear mechanism 28 is the transmission mechanism that establishes the speed ratio EL lower than the lowest speed ratio γmax of the continuously variable transmission 24; however, the gear mechanism 28 is not limited to this configuration. For example, the gear mechanism 28 may be a transmission mechanism that establishes a speed ratio EH higher than the highest speed ratio γmin of the continuously variable transmission 24 or may be a transmission mechanism that establishes both the low speed ratio EL and the high speed ratio EH. The invention can also be applied to the thus configured gear mechanism 28. This also applies to the case where the gear mechanism 28 is a transmission mechanism having a plurality of gear stages.

In the above-described embodiments, the driving pattern of the power transmission system 16 is changed by using the predetermined shift map; however, the invention is not limited to this configuration. For example, the driving pattern of the power transmission system 16 may be changed by calculating a driver's driving request amount (for example, required torque) on the basis of the vehicle speed V and the accelerator operation amount θacc and then setting a speed ratio that satisfies the required torque.

In the above-described embodiments, the engine 12 is illustrated as the driving force source; however, the invention is not limited to this configuration. For example, an internal combustion engine, such as a gasoline engine and a diesel engine, is used as the driving force source. Instead, another prime motor, such as an electric motor, may be employed solely or in combination with the engine 12, as the driving force source. The power of the engine 12 is transmitted to the continuously variable transmission 24 or the gear mechanism 28 via the torque converter 20; however, the invention is not limited to this configuration. For example, instead of the torque converter 20, another fluid transmission device, such as a fluid coupling having no torque amplification function, may be used. Alternatively, the fluid transmission device is not necessarily provided.

The above-described embodiments are only illustrative, and the invention may be implemented in modes including various modifications or improvements on the basis of the knowledge of persons skilled in the art.

What is claimed is:

1. A control apparatus for a vehicle, the vehicle comprising:
   a continuously variable transmission;
   a transmission mechanism coupled to an input shaft via a switching device and the transmission mechanism having at least one gear stage, the switching device comprising a planetary gear train, the continuously variable transmission and the transmission mechanism being provided in parallel with each other between an input rotating member and an output rotating member, power of a driving force source being transmitted to the input rotating member, the output rotating member being configured to output the power to a drive wheel; and
   a clutch mechanism comprising a plurality of clutches and a brake and the clutch mechanism being configured to selectively change a power transmission path between a first power transmission path and a second power transmission path,
   wherein:
      the first power transmission path is configured to transmit the power of the driving force source to the drive wheel via the continuously variable transmission,
      the second power transmission path is configured to transmit the power of the driving force source to the drive wheel via the transmission mechanism, and
      the control apparatus comprising:
         an electronic control unit configured to, when the power is transmitted to the drive wheel through the second power transmission path, control the continuously variable transmission such that a first speed ratio for a first angular acceleration of the input rotating member is higher than a second speed ratio for a second angular acceleration of the input rotating member, wherein the first angular acceleration of the input rotating member is smaller than the second angular acceleration of the input rotating member.

2. The control apparatus according to claim 1 wherein the electronic control unit is configured to:
   i) calculate an estimated value of a friction loss of the continuously variable transmission;
   ii) calculate an estimated value of an inertial loss of the continuously variable transmission;
   iii) calculate a target speed ratio of the continuously variable transmission based on the estimated value of the friction loss and the estimated value of the inertial loss; and
   iv) when the power is transmitted to the drive wheel through the second power transmission path, control the continuously variable transmission at the target speed ratio.

3. The control apparatus according to claim 2, wherein the target speed ratio is a speed ratio of the continuously variable transmission configured to reduce a sum of the estimated value of the friction loss and the estimated value of the inertial loss to a certain limit.

4. The control apparatus according to claim 2, wherein the electronic control unit is configured to, when the power is transmitted to the drive wheel through the second power transmission path, control the continuously variable transmission at the target speed ratio until the electronic control unit determines to change the power transmission path to the first power transmission path.

5. The control apparatus according to claim 2, wherein the electronic control unit is configured to:
   i) calculate an estimated value of a device loss of a thrust supply device configured to supply thrust to a rotating member of the continuously variable transmission, and
   ii) calculate the target speed ratio of the continuously variable transmission based on the estimated value of the friction loss, the estimated value of the inertial loss and the estimated value of the device loss.

6. The control apparatus according to claim 1, wherein the electronic control unit is configured to:
   i) calculate a target speed ratio of the continuously variable transmission based on the angular acceleration of the input rotating member by using a predetermined correlation between (a) the angular acceleration of the input rotating member and (b) a speed ratio of the continuously variable transmission for reducing a sum of a friction loss of the continuously variable transmission and an inertial loss of the continuously variable transmission to a certain limit, the predetermined correlation being determined such that the first speed ratio for the first angular acceleration of the input rotating member is higher than the second speed ratio for the second angular acceleration of the input rotating member, and
   ii) when the power is transmitted to the drive wheel through the second power transmission path, control the continuously variable transmission at the target speed ratio.

7. A control apparatus for a vehicle, the vehicle comprising:
   a continuously variable transmission;
   a transmission mechanism coupled to an input shaft via a switching device and the transmission mechanism having at least one gear stage, the switching device comprising a planetary gear train, the continuously variable transmission and the transmission mechanism being provided in parallel with each other between an input rotating member and an output rotating member, power of a driving force source being transmitted to the input rotating member, the output rotating member being configured to output the power to a drive wheel; and
   a clutch mechanism comprising a plurality of clutches and a brake and the clutch mechanism being configured to selectively change a power transmission path between a first power transmission path and a second power transmission path,
   wherein:
      the first power transmission path is configured to transmit the power of the driving force source to the drive wheel via the continuously variable transmission,
      the second power transmission path is configured to transmit the power of the driving force source to the drive wheel via the transmission mechanism, and
      the control apparatus comprises an electronic control unit configured to:
         i) calculate an estimated value of a friction loss of the continuously variable transmission,
         ii) calculate an estimated value of an inertial loss of the continuously variable transmission,
         iii) calculate a target speed ratio of the continuously variable transmission based on the estimated value of the friction loss and the estimated value of the inertial loss, and
         iv) when the power is transmitted to the drive wheel through the second power transmission path, control the continuously variable transmission at the target speed ratio.

8. The control apparatus according to claim 7, wherein the target speed ratio is a speed ratio of the continuously variable transmission for reducing a sum of the estimated value of the friction loss and the estimated value of the inertial loss to a certain limit.

9. The control apparatus according to claim 7, wherein the electronic control unit is configured to, when the power is transmitted to the drive wheel through the second power transmission path, control the continuously variable transmission at the target speed ratio until the electronic control unit determines to change the power transmission path to the first power transmission path.

10. The control apparatus according to claim 7, wherein the electronic control unit is configured to:
   i) calculate an estimated value of a device loss of a thrust supply device configured to supply thrust to a rotating member of the continuously variable transmission, and
   ii) calculate the target speed ratio of the continuously variable transmission based on the estimated value of the friction loss, the estimated value of the inertial loss, and the estimated value of the device loss.

* * * * *